Patented Jan. 24, 1933

1,895,099

UNITED STATES PATENT OFFICE

RUDOLPH JUNG, OF OFFENBACH-ON-THE-MAIN, GERMANY, ASSIGNOR TO GENERAL ANILINE WORKS, INC., OF NEW YORK, N. Y., A CORPORATION OF DELAWARE

SOLID PREPARATION YIELDING NITROSO DIAZO SOLUTIONS OF THE DIPHENYLAMINE SERIES AND PROCESS OF MAKING SAME

No Drawing. Application filed March 8, 1929, Serial No. 345,599, and in Germany March 15, 1928.

My present invention relates to solid compositions yielding when dissolved in water nitroso diazo solutions to be used for dyeing purposes, more particularly it relates to solid compositions comprising a solid diazo preparation of the diphenylamine series and solid substances capable of producing nitrous acid when the compositions are dissolved in water.

Diazo compounds of the diphenylamine series yield valuable blue shades when combined on the fiber with 2.3-hydroxy-naphthoic acid arylamides. It has been found, however, that the N-nitroso-diphenylamine-diazo compounds have a higher combining power than the diazo compounds free from nitroso groups, and the nitroso diazo compounds, therefore, are advantageously used for the preparation of the dyestuffs. The nitroso group is split off from the complete dyestuff by a suitable after-treatment of the dyed material.

In order that the dyer may not have to manufacture diazo compounds it is customary in the art to furnish him with ready-made diazo preparations. But solid nitrosodiazo preparations of the diphenylamine series cannot be produced on a technical scale as according to my experiments the nitroso groups are split off during the drying process.

I have now found that solid preparations yielding solutions of nitrosodiazo compounds of the diphenylamine series are obtainable by mixing together a solid diazo preparation of the diphenylamine series, a dry alkali nitrite and a solid substance adapted to liberate nitrous acid from the nitrite. To this mixture a solid water-binding salt may further be added. The substance adapted to liberate nitrous acid for example, an acid or an acid salt, may be omitted, when the diazonium salt contains already an acidic component delivering hydrogen ions when dissolved in water, or also when the preparation mixture is dissolved for use in water containing the sufficient amount of an acid.

The new preparations thus produced show a good stability and yield nitrosodiazo solutions ready for use by simply dissolving them in water or acidulated water.

In order to further illustrate my invention the following examples are given, but I wish it to be understood that I am not limited to the particular products or reaction conditions mentioned therein; the parts are by weight:

*Example 1.*—355 parts of the dry double salt of zinc chloride and diphenylamine-4-diazoniumchloride corresponding to 184 parts of the base are intimately mixed with 400 parts of anhydrous sodium sulfate and then with 69 parts of dry sodium nitrite.

By dissolving this preparation in water containing the sufficient amount of an acid a solution of the N-nitroso-diphenylamine-4-diazonium salt is obtained which is ready for use after standing a short while.

*Example 2.*—400 parts of the dry double salt of zinc chloride and diphenylamine-4-diazoniumchloride corresponding to 184 parts of the base are intimately mixed with 520 parts of anhydrous sodium sulfate, then with 69 parts of dry nitrite and 45 parts of anhydrous oxalic acid.

By dissolving this preparation in water a solution of the N-nitroso-diphenylamine-4-diazonium salt is obtained which is ready for use after shortly standing.

*Example 3.*—430 parts of the dry acid sulfate of 4'-methoxy-diphenylamine-4-diazonium corresponding to 214 parts of the base are intimately mixed with 540 parts of anhydrous sodium sulfate and then with 69 parts of dry sodium nitrite.

By dissolving this preparation in water a solution of the N-nitroso-4'-methoxy-diphenylamine-4-diazonium salt is obtained.

*Example 4.*—430 parts of the dry benzene sulfonate of 4'-methoxy-diphenylamine-4-diazonium corresponding to 214 parts of the base are intimately mixed with 570 parts of anhydrous sodium sulfate and then with 69 parts of dry sodium nitrite and 120 parts of sodium bisulfate.

By dissolving this preparation in water a solution of the N-nitroso-4'-methoxy-diphenylamine-4-diazonium salt is obtained.

I claim:

1. Compositions of matter comprising a solid diazo preparation of an amino-diphenylamine compound of the general formula:

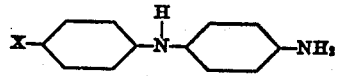

wherein X stands for hydrogen or an alkoxy group, and solid substances capable of producing nitrous acid when the mixture is dissolved in water.

2. Compositions of matter comprising a solid diazo preparation of an amino-diphenylamine compound of the general formula:

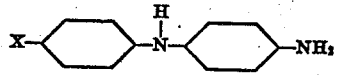

wherein X stands for hydrogen or an alkoxy group, a water-binding salt, a dry alkali nitrite and a solid substance capable of reacting with the nitrite to liberate nitrous acid when the mixture is dissolved in water.

3. Compositions of matter comprising a solid diazo preparation of 4'-methoxy-4-amino-diphenylamine, a solid water-binding salt, a dry alkali nitrite and a solid substance capable of reacting with the nitrite to liberate nitrous acid when the mixture is dissolved in water.

4. A composition of matter comprising 430 parts of dry 4'-methoxy-diphenylamine-4-diazonium-benzene-sulfonate (corresponding to 214 parts of the base), 570 parts of anhydrous sodium sulfate, 69 parts of dry sodium nitrite and 120 parts of sodium bisulfate.

In testimony whereof, I affix my signature.

RUDOLPH JUNG.